(No Model.) 2 Sheets—Sheet 1.
H. H. CUMMINGS.
STREET CAR.
No. 441,647. Patented Dec. 2, 1890.
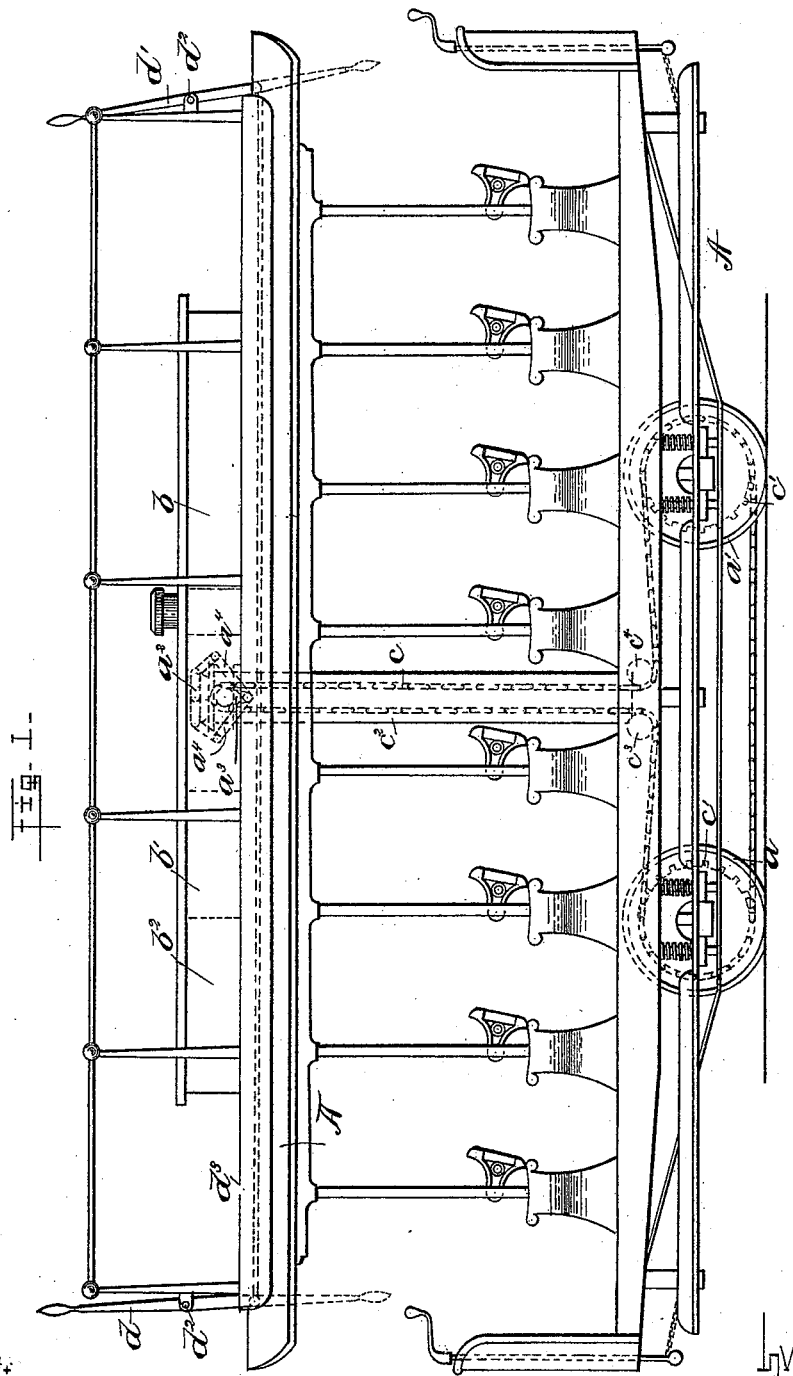

(No Model.) 2 Sheets—Sheet 2.
H. H. CUMMINGS.
STREET CAR.
No. 441,647. Patented Dec. 2, 1890.
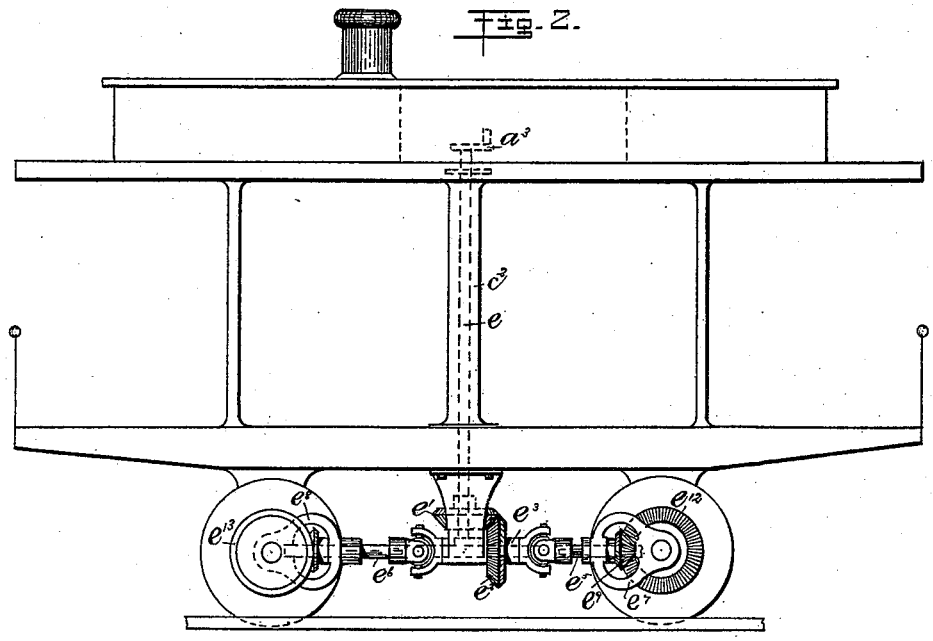
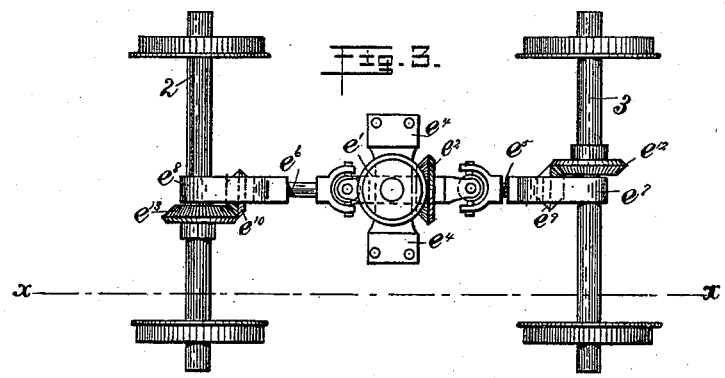
Witnesses:
Geo. C. Hunting
Frederick L. Emery
Inventor:
Henry H. Cummings,
by Lemby & Gregory
Attys.

UNITED STATES PATENT OFFICE.

HENRY H. CUMMINGS, OF MALDEN, MASSACHUSETTS.

STREET-CAR.

SPECIFICATION forming part of Letters Patent No. 441,647, dated December 2, 1890.

Application filed March 31, 1890. Serial No. 345,944. (No model.)

*To all whom it may concern:*

Be it known that I, HENRY H. CUMMINGS, of Malden, county of Middlesex, State of Massachusetts, have invented an Improvement in Street-Railway Cars, of which the following description, in connection with the accompanying drawings, is a specification, like letters and figures on the drawings representing like parts.

This invention relates to street-railway cars, and has for its object to construct a car whereby it may be propelled by an engine or motor carried on the top or roof of the car.

In accordance with my invention an engine—preferably a steam-engine—is supported by the roof or top of the car, and has its crank-shaft operatively connected—preferably by sprocket wheels and chain—to the car-axles located below the car, so that revolution of the crank-shaft will produce revolution of the car-axles. The sprocket-chain is carried from the crank-shaft preferably down through a cylinder or tube located near the longitudinal center of the car.

The operation of the engine may be controlled from either end of the car, either from the roof or from the platform of the car, as will be described.

My invention, therefore, consists in the combination, with a car mounted on axles having wheels, of an engine or motor located upon the roof of the said car, and mechanism, substantially as described, connected to the said engine or motor and to the car-axles, substantially as will be specified.

Other features of my invention will be pointed out in the claims at the end of this specification.

Figure 1 represents in side elevation an open street-railway car embodying my invention; Fig. 2, a modification, in section and elevation, to be referred to, the section being taken on line $x\ x$, Fig. 3; and Fig. 3, a plan view of the car-axles and driving mechanism shown in Fig. 2.

The car A, herein shown as open at its sides and mounted to run on wheels $a\ a'$, may be of any usual or well-known construction, such as now commonly used on street-railways. The car A, in accordance with my present invention, has mounted upon its roof $A'$ an engine $a^2$, which is preferably a steam-engine, having its main shaft provided with a crank $a^3$, which is joined, as herein shown, by connecting-rods $a^4$ to the piston rod or rods (not shown) of the engine $a^2$. The engine $a^2$ is preferably a steam-engine operated by steam generated in a boiler $b$, the water-tank $b'$ and fuel-supply tank $b^2$ being also, preferably, carried on the roof of the car.

The main or crank shaft of the engine is operatively connected with the axles 2 3 of the car-wheels $a\ a'$, as shown in Fig. 1, by a sprocket-chain $c$, passed about a sprocket-wheel on the crank-shaft and about sprocket-wheels $c'$ on the axles of the car-wheels, the said sprocket-chain being carried from the crank-shaft, preferably, down through a tube or pipe $c^2$, located near the longitudinal center of the car and extended from the roof to below the floor of the car, the said sprocket-chain passing under idler rollers or wheels $c^3$ $c^4$ below the car-floor.

The engine $a^2$ will be provided with the usual valve for controlling the steam, which is not herein shown, and the said valve may be operated from either end of the car, as herein shown, by means of levers $d\ d'$, pivoted, as at $d^2$, and connected to a rod $d^3$, which may be the valve-rod of the engine, or which may be connected to said valve-rod. If desired, the levers $d\ d'$ may be extended down below the roof $A'$, as indicated by dotted lines, so that the engine may be controlled from the car-platform.

In operation the driver may start the car in motion in either direction by operating either one of the levers $d\ d'$ to open the valve of the engine and admit steam into the cylinder.

I may prefer to employ sprocket wheels and chain by which to connect the main or crank shaft of the engine with the car-axles; but I do not desire to limit myself to this particular form of connecting mechanism, as other equivalent forms may be used—for instance, as shown in Figs. 2 and 3, wherein the crank $a^3$ is shown horizontal and connected to a rod or spindle $e$, extended down through the tube $c^2$, the said spindle or rod having secured to it at its lower end below the car-floor a bevel-gear $e'$. The bevel-gear $e'$ meshes with a bevel-gear $e^2$ on a shaft $e^3$, having bearings in a suitable bracket $e^4$, attached to the car-body. The shaft $e^3$ is connected, as herein shown, by universal joints to shafts $e^5$ $e^6$, supported by brackets or castings $e^7$ $e^8$, mounted on the car-axles 3 2. The shafts $e^5$ $e^6$ have mounted on them bevel-gears $e^9$ $e^{10}$, which mesh with bevel-gears $e^{12}$ $e^{13}$ on the car-axles 3 2, the gears $e^{12}$ $e^{13}$ being secured to the car-axles on opposite sides of the castings $e^7$ $e^8$, as shown in Fig. 3, so that the car-axles may be rotated in the same direction.

I have herein described the driving-shaft as forming part of a steam-engine; but I do not desire to limit myself in this respect, as it may be the main shaft of a gas, air, or other engine, or it may be the armature-shaft of an electric motor.

By locating the engine and its boiler on the roof of the car, above passengers, the heat, smoke, or gases which may be generated pass upward, and thereby avoid any inconveniences to passengers. So, also, the said engine or motor is removed from proximity to the street and liability of its becoming deranged by dust and mud obviated.

I claim—

1. The combination, with a car mounted on axles having wheels and located below the car, of an engine or motor located upon the roof of the said car, and mechanism, substantially as described, connected to the said engine or motor and extended therefrom to the car-axles below the car, substantially as specified.

2. The combination, with a car mounted on axles having wheels and located below the car and provided with a cylinder or tube extended through the car from its roof or top to the floor of the car, of an engine or motor located upon the top or roof of the said car, and mechanism, substantially as described, extended through the said tube to connect the said engine with the car-axles, substantially as described.

3. The combination, with a car mounted on axles having wheels and located below the car, of sprocket-wheels on said axles, an engine or motor located on the roof or top of the car and provided with a shaft having a sprocket-wheel, and a sprocket-chain passed about the said sprocket-wheels above and below the car, substantially as described.

In testimony whereof I have signed my name to this specification in the presence of two subscribing witnesses.

HENRY H. CUMMINGS.

Witnesses:
JAS. H. CHURCHILL,
EMMA J. BENNETT.